US011076283B2

(12) United States Patent
Nori et al.

(10) Patent No.: US 11,076,283 B2
(45) Date of Patent: Jul. 27, 2021

(54) REMOTE SUBSCRIBER IDENTITY MODULE

(71) Applicant: Google LLC, Mountain View, CA (US)

(72) Inventors: Vasudeva Nori, Cupertino, CA (US);
Syed Rizvi, El Cerrito, CA (US);
Joseph Pirozzo, Los Altos, CA (US);
Haris Ramic, San Francisco, CA (US);
Amit Mahajan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/764,300

(22) PCT Filed: Feb. 28, 2019

(86) PCT No.: PCT/US2019/020082
§ 371 (c)(1),
(2) Date: May 14, 2020

(87) PCT Pub. No.: WO2020/091828
PCT Pub. Date: May 7, 2020

(65) Prior Publication Data
US 2020/0367048 A1 Nov. 19, 2020

Related U.S. Application Data

(60) Provisional application No. 62/752,804, filed on Oct. 30, 2018.

(51) Int. Cl.
*H04W 8/18* (2009.01)
*H04L 29/06* (2006.01)
(Continued)

(52) U.S. Cl.
CPC ......... *H04W 8/183* (2013.01); *H04L 63/0853* (2013.01); *H04M 1/6091* (2013.01);
(Continued)

(58) Field of Classification Search
CPC ..... H04W 8/183; H04W 8/205; H04W 12/06; H04W 88/04; H04W 4/80; H04L 63/0853; H04M 1/6091; H04M 1/7253
(Continued)

(56) References Cited

U.S. PATENT DOCUMENTS 6,141,564 A 10/2000 Bruner et al.
2010/0304670 A1 12/2010 Shuo
(Continued)

FOREIGN PATENT DOCUMENTS

| EP | 2007109 A1 | 12/2008 |
| KR | 10-2008-0091597 A | 10/2008 |
| WO | 2005104575 A1 | 11/2005 |

OTHER PUBLICATIONS

European Telecommunications Standards Institute, "Smart Cards; UICC-Terminal Interface; Physical and Logical Characteristics (Release 8)," ETSI TS 102 221 v8.2.0, Published 2009, 174 Pages.
(Continued)

*Primary Examiner* — Hirdepal Singh
(74) *Attorney, Agent, or Firm* — Shumaker & Sieffert, P.A.

(57) ABSTRACT

An example method includes receiving, by a sink device and from a source device, identity information corresponding to a subscriber information module (SIM) of the source device via a connection between the sink device and the source device; registering, at the sink device, a remote SIM with the identity information corresponding to the SIM of the source device; and communicating, by an application of the sink device and using the remote SIM, with an external device via a cellular radio transceiver of the source device.

17 Claims, 5 Drawing Sheets

(51) Int. Cl.
*H04M 1/60* (2006.01)
*H04W 8/20* (2009.01)
*H04W 12/06* (2021.01)
*H04M 1/72412* (2021.01)

(52) U.S. Cl.
CPC ....... *H04M 1/72412* (2021.01); *H04W 8/205* (2013.01); *H04W 12/06* (2013.01)

(58) Field of Classification Search
USPC .......................................... 455/558
See application file for complete search history.

(56) References Cited

U.S. PATENT DOCUMENTS

| 2012/0115542 | A1 | 5/2012 | Griffin et al. | |
| 2017/0048652 | A1* | 2/2017 | Del Rio | H04W 84/18 |
| 2017/0332273 | A1* | 11/2017 | Link, II | H04W 36/0027 |
| 2018/0091501 | A1* | 3/2018 | Trahe | H04L 63/0853 |
| 2019/0274015 | A1* | 9/2019 | Surnilla | G07C 5/0808 |
| 2020/0092711 | A1* | 3/2020 | Chen | H04B 1/3816 |
| 2020/0137566 | A1* | 4/2020 | Jin | H04W 76/14 |

OTHER PUBLICATIONS

GSM Association, "RSP Technical Specification," GSMA Version 2.2, Published Sep. 1, 2017, 264 pages.
International Search Report and Written Opinion of International Application No. PCT/US2019/020082, dated May 22, 2019, 18 pp.
Response to Communication Pursuant to Rules 161(1) and 162 EPC dated Jun. 8, 2020 from counterpart European Application No. 19711208.9 and filed Nov. 23, 2020, 19 pp.
International Preliminary Report on Patentability from International Application No. PCT/US2019/020082, dated May 14, 2021, 12 pp.
Office Action from counterpart Korean Application No. 10-2020-7015695 dated Apr. 21, 2021, 11 pp.

* cited by examiner

REMOTE SUBSCRIBER IDENTITY MODULE

BACKGROUND

Some computing devices (e.g., mobile phones) utilize subscriber identity modules (SIMs), also referred to as SIM cards, to connect to mobile networks. A SIM card is, in general, a smart card that is used in connection with cellular phones/devices that follow cellular standards (e.g., GSM, CDMA, etc.). SIM cards can be removed from devices and used by the subscriber in other devices, thereby allowing users the flexibility of being able to take their "identity" with them from device to device. Additionally, some devices include so called embedded SIMs (eSIMs), which enable users to select the operator (e.g., carrier, provider, etc.) of their choice and then securely download that operator's SIM application to their eSIM enabled device, thereby configuring the eSIM enabled device to communicate via a cellular network without using a physical SIM card.

However, despite the relative portability of SIM cards and eSIM technology, it may not be practical for users to transfer their SIM cards between devices. For instance, it may be relatively inconvenient for a user to transfer their SIM cards between frequently used devices (e.g., between a mobile phone and a vehicle).

SUMMARY

In general techniques of this disclosure are directed to enabling a computing device to configure another device to utilize a SIM and corresponding cellular radio of the computing device, in absence of or instead of, a local SIM or local radio of the other device. For instance, a mobile device having a SIM may provide a remote device (e.g., a vehicle infotainment system) with data to enable the remote device to create a remote SIM with information corresponding to the SIM of the mobile device. An operating system of the remote device may present the remote SIM to applications executing at the remote device in a manner similar to how an operating system of the mobile device may present the SIM of the mobile device (i.e., a local SIM) to applications executing at the mobile device. In this way, applications that are written to utilize a local SIM may execute at devices with remote SIMs without modification.

Throughout the disclosure, examples are described wherein a computing device and/or computing system may analyze information (e.g., e-mail, other communications, and the like) associated with the computing device the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over whether information is collected about the user and how such information, if collected, may be used by the computing device and/or computing system.

The details of one or more examples are set forth in the accompanying drawings and the description below. Other features, objects, and advantages of the disclosure will be apparent from the description and drawings, and from the claims.

DETAILED DESCRIPTION

Figure 1:
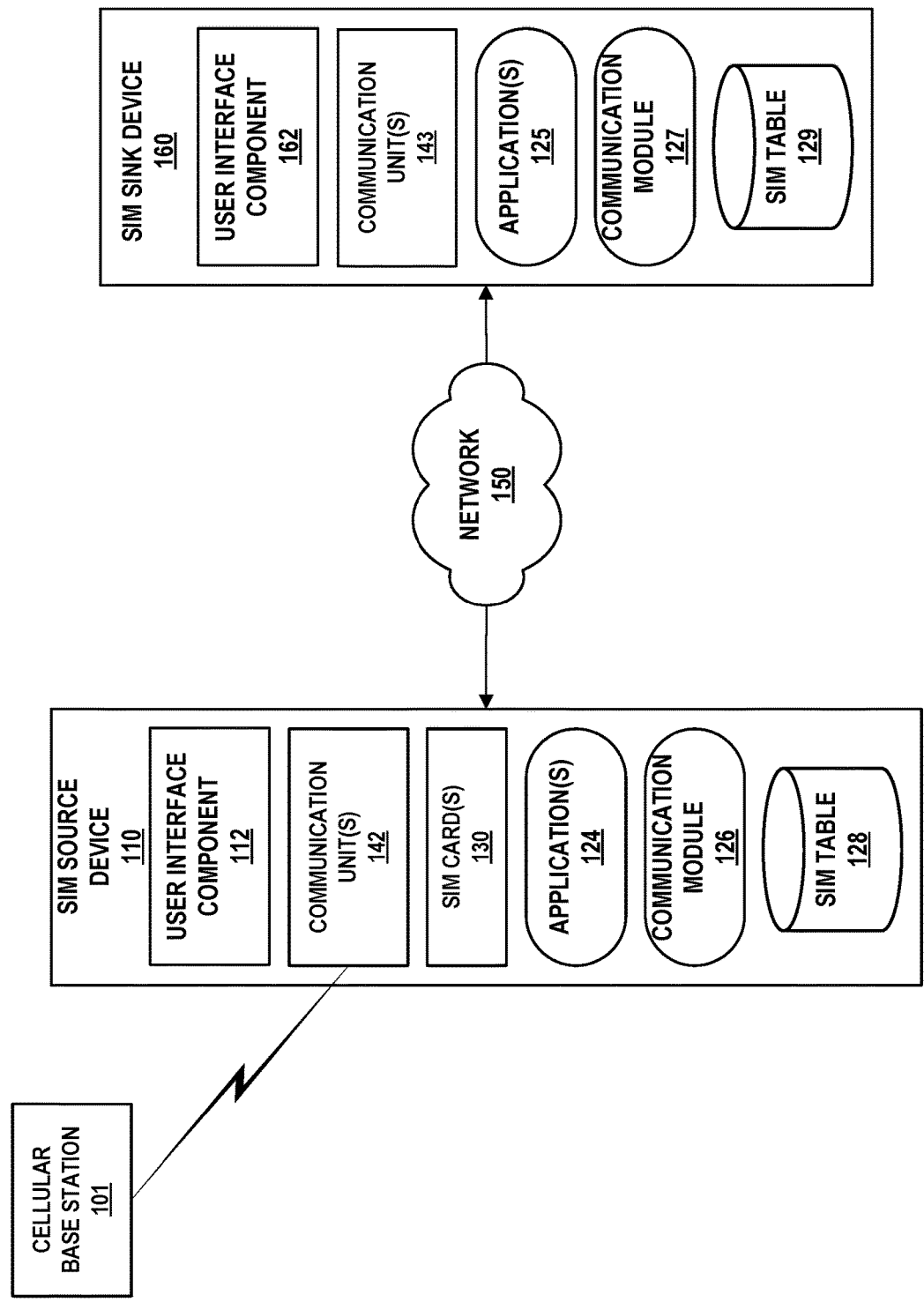
FIG. 1 is a conceptual diagram illustrating an example computing system including devices configured to enable remote SIM functionality, in accordance with one or more aspects of the present disclosure.

In general techniques of this disclosure are directed to enabling a computing device (referred to as a "SIM source device") to allow another device (referred to as a "SIM sink device") to utilize a SIM of the SIM source device. For instance, a SIM source device having a local SIM (e.g., physical SIM or eSIM) may provide a SIM sink device with data that enables the remote device to create/register a remote SIM with information corresponding to the SIM of the SIM source device. An operating system of the SIM sink device may present the remote SIM to applications executing at the SIM sink device in a manner similar to how an operating system of the SIM source device may present the SIM of the SIM source device (referred to as a "local SIM") to applications executing at the SIM source device. In this way, applications that are written to utilize a local SIM may execute at devices with remote SIMs without modification.

An application executing at the SIM sink device may communicate using the remote SIM. For instance, where the application is a short message service (SMS) application, the SMS application executing at the SIM sink device may output a SMS message that, to a recipient, is indistinguishable from an SMS message output by a SMS application executing at the SIM source device using the local SIM of the SIM source device. In some examples, the SIM sink device may communicate using the remote SIM via cellular radio hardware of the SIM sink device. For instance, the SMS application executing at the SIM sink device may cause cellular hardware of the SIM sink device to transmit the SMS message (e.g., to a cell tower or other base station). In some examples, the SIM sink device may communicate using the remote SIM via cellular radio hardware of the SIM source device. For instance, the SMS application executing at the SIM sink device may transmit (e.g., via a wired or wireless connection) the SMS message to the SIM source device such that cellular hardware of the SIM source device transmits the SMS message (e.g., to a cell tower or other base station).

In this way, the described techniques may enable a computing device, such as a SIM sink device, to communicate using a SIM of another device without having to include a cellular radio capable of communicating using the SIM of the other device. As such, the described techniques may improve the underlying functionality of one or both of a SIM source device and a SIM sink device. That is, unlike other computing devices that require a local SIM or do not enable other devices to utilize SIMs of different devices, the described techniques may enable a first device to provide a second device with the ability to communicate via a local SIM of the first device. Furthermore, the applications may benefit from a performance gain, if, for example the source device has more advanced or less dated cellular radio technology than the sink device (e.g., when the source device is a mobile phone and the sink device is an automobile).

FIG. 1 is a conceptual diagram illustrating an example computing system including devices configured to enable remote SIM functionality, in accordance with one or more aspects of the present disclosure. As shown in FIG. 1, system 100 may include SIM source device 110, network 150, and SIM sink device 160. Examples of each of SIM source device 110 and SIM sink device 160 include, but are not limited to, a mobile phone, a tablet computer, a laptop computer, a wearable device (e.g., a computerized watch, computerized eyewear, computerized gloves, etc.), a personal digital assistants (PDA), a fitness tracker, a portable gaming system, a media player, an e-book reader, a mobile television platform, a vehicle computing system (e.g., head mounted display, infotainment system, or other vehicle system), or any other type of computing device.

Network 150 represents any wired or wireless communications network for transmitting data between computing devices, such as SIM source device 110 and SIM sink device 160. As discussed in further detail below, SIM source device 110 may exchange data, via network 150, with SIM sink device 160 to enable SIM sink device 160 to register and utilize a remote SIM card corresponding to a SIM card of SIM source device 110. Network 150 may include one or more network hubs, network switches, network routers, or any other network equipment, that are operatively intercoupled thereby providing for the exchange of information between SIM sink device 160 and SIM source device 110. SIM source device 110 and SIM sink device 160 may transmit and receive data across network 150 using any suitable communication techniques. SIM source device 110 and SIM sink device 160 may each be operatively coupled, or at least communicatively coupled, to network 150 using respective network links. The links coupling SIM source device 110 and SIM sink device 160 to network 150 may be a combination of one or more universal serial bus (USB), Ethernet, Bluetooth, Wi-Fi, or other types of connections and such connections may be wireless and/or wired connections.

SIM source device 110 includes user interface component (UIC) 112, one or more communication units 142, one or more SIM cards 130, one or more applications 124, and communication module 126; SIM sink device 160 includes user interface component (UIC) 162, one or more communication units 143, one or more applications 125, and communication module 127. In general, unless otherwise stated, modules 124, 125, 126, and 127 may perform operations described herein using software, hardware, firmware, or a mixture of hardware, software, and firmware residing in and/or executing at SIM source device 110 and SIM sink device 160. SIM source device 110 and SIM sink device 160 may execute modules 124, 125, 126, and 127 with multiple processors or multiple devices, as virtual machines executing on underlying hardware, as one or more services of an operating system or computing platform, and/or as one or more executable programs at an application layer of a computing platform of SIM source device 110 or SIM sink device 160. In some examples, SIM source device 110 and SIM sink device 160 download any of modules 124, 125, 126, and 127 from an application repository (e.g., an app store) or other database. In some examples, SIM source device 110 and SIM sink device 160 are preloaded with modules 124, 125, 126, and 127 during production and prior to being provided to a user.

UIC 112 of SIM source device 110 functions as an input and/or output device for SIM source device 110 and UIC 162 functions as an input and/or output device for SIM sink device 160. UIC 112 and UIC 162 may each be implemented using various technologies. For instance, UIC 112 and UIC 162 may function as input devices using presence-sensitive input screens, microphone technologies, infrared sensor technologies, or other input device technology for use in receiving user input. UIC 112 and UIC 162 may function as output devices configured to present output to a user using any one or more display devices, speaker technologies, haptic feedback technologies, or other output device technology for use in outputting information to a user. As input devices, UIC 112 and UIC 162 detects input (e.g., touch and non-touch input) from a user. Examples of user input gestures performed by a user (e.g., the user touching, pointing, and/or swiping at or near one or more locations of UIC 112 and UIC 162 with a finger or a stylus pen). As output devices, UIC 112 and UIC 162 presents information (e.g., audible, visual, and/or haptic information) to a user in the form of a user interfaces.

Application modules 124 and 125 include any application that executes at a computing device, such as, respectively, SIM source device 110 or SIM sink device 160. Application modules 124 and 125 may execute at an application and/or operating system layer of a computing platform or operating system of, respectively, SIM source device 110 or SIM sink device 160. Examples of application modules 124 and 125 include messaging applications, telephone applications, audio and/or video conferencing applications, e-mail clients, web browsers, calendar applications, social media applications, camera applications, media playback applications, timer applications, games, fitness tracking applications, health monitoring applications, map or navigation applications, office productivity applications, virtual assistant applications, e-book reading applications, or any other type of first party or third-party application configured to execute at a computing device, such as SIM source device 110 and SIM sink device 160.

One or more communication units 142 of SIM source device 110 and/or one or more communication units 143 of SIM sink device 160 may communicate with external devices via one or more wired and/or wireless networks by transmitting and/or receiving network signals on the one or more networks. Examples of communication units 142 and communication units 143 include a network interface card (e.g. such as an Ethernet card), an optical transceiver, a radio frequency transceiver, a GPS receiver, or any other type of device that can send and/or receive information. Other examples of communication units 142 and communication units 143 may include short wave radios, cellular data radios (e.g., GSM radios, CDMA radios, and the like), wireless network radios (e.g., Bluetooth Radios), as well as universal serial bus (USB) controllers.

SIM cards 130 may represent one or more subscriber identity modules that are local to SIM source device 110. As such, SIM cards 130 may be referred to as local SIMs of SIM source device 110. SIM cards 130 can include any combination of physical or eSIMs. Each of SIM cards 130 may include subscriber identity information that enables a cellular radio of communication units 142 to communicate with a cellular network. The identity information may enable the cellular network to associate SIM source device 110 with a particular user account (e.g., for data access, billing, data routing, etc.). Examples of identity information may include, but are not limited to, a serial number (ICCID), an international mobile subscriber identity (IMSI) number, an authentication Key (Ki), a local area Identity (LAI) and an operator-specific emergency number, a short message service center (SMSC) number, a service provider name (SPN), service dialing numbers (SDN), advice-of-charge parameters, value added service (VAS) applications, and a media access control (MAC) address of SIM source device 110. In some examples, SIM sink device 160 may include one or more local SIM cards.

As illustrated in FIG. 1, one or more of communication units 142 may include a cellular transceiver capable of communicating with a cellular base station (e.g., a cell tower, microcell, femtocell, etc.) The cellular transceiver may be capable of communicating using identity information of one of SIM cards 130.

Communication module 126 of SIM source device 110 and/or communication module 127 of SIM sink device 160 may manage and facilitate communications with external devices, respectively, via communication units 142 or communication units 143. For instance, each of communication module 126 and communication module 127 may manage which SIMs are available to applications executing at their respective devices. As an example, communication module 126 may register one or more of SIM cards 130 for use by applications 124. Communication modules 126 and 127 may respectively maintain SIM tables 128 and 129. Each of SIM tables 128 and 129 may include a list of SIMs that are available for use. In some examples, SIM tables 128 and 129 may include additional information for each of the available SIMs. Some examples, of additional information include, but are not limited to, a subscription identifier, a slot index, a carrier name, a phone number, an ICC identifier, a mobile country code, a mobile network code, and the like. Communication modules 126 and 127 may execute at an application and/or operating system layer of a computing platform or operating system of, respectively, SIM source device 110 or SIM sink device 160.

Communication module 126 may register a SIM for use at SIM source device 110 by adding a subscription for the SIM in a table of SIMs maintained by communication module 126. Similarly, communication module 127 may register a SIM for use at SIM sink device 160 by adding a subscription for the SIM in a table of SIMs maintained by communication module 127.

In operation, a user with SIM source device 110 may desire to utilize SIM sink device 160 to perform one or more actions that require SIM sink device 160 to have an active SIM. For instance, the user may desire to utilize SIM sink device 160 to send/receive one or more SMS messages, send/receive data, make/receive calls, or to perform any other data transfer or telecommunications activity, using the identity corresponding to a particular SIM card of SIM cards 130 of SIM source device 110.

In accordance with one or more techniques of this disclosure, SIM source device 110 may enable SIM sink device 160 to utilize the identity corresponding to a particular SIM card of SIM cards 130 of SIM source device 110. For instance, SIM source device 110 and SIM sink device 160 may establish a connection via network 150 (e.g., a Bluetooth link). SIM source device 110 may output, to SIM sink device 160 and via connection 150, identity information corresponding to the particular SIM card of SIM cards 130. In some examples, the identity information may include all or a portion of information included in an entry in SIM table 128 corresponding to the particular SIM card.

SIM sink device 160 may register a remote SIM with the received identity information of the particular SIM card of SIM cards 130. For instance, communication module 127 may create an entry in SIM table 129. In some examples, communication module 127 may create the entry for the remote SIM in SIM table 129 with a reserved slot index (i.e., a slot index that is reserved for remote SIMs). In this way, communication module 127 register a remote SIM that is usable to applications 125 as if it were a local SIM of SIM sink device 160.

SIM sink device 160 may communicate using the remote SIM. For instance, a messaging application of applications 125 may output a SMS message that, to its recipient, is indistinguishable from an SMS message output by a SMS application of applications 124 executing at the SIM source device using the local SIM of the SIM source device. In some examples, SIM sink device 160 may communicate using the remote SIM via cellular radio hardware of communications units 143. For instance, the SMS application of applications 125 executing at SIM sink device 160 may cause cellular hardware of communications units 143 to transmit the SMS message (e.g., to a cell tower or other base station). In some examples, SIM sink device 160 may communicate using the remote SIM via cellular radio hardware of SIM source device 110. For instance, the SMS application of applications 125 executing at SIM sink device 160 may transmit, via network 150 (e.g., via a Bluetooth link), the SMS message to SIM source device 110 such that cellular hardware of communication units 142 transmits the SMS message (e.g., to a cell tower or other base station).

Throughout the disclosure, examples are described wherein a computing device and/or computing system may analyze information (e.g., e-mail, other communications, and the like) associated with the computing device the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

Figure 2:
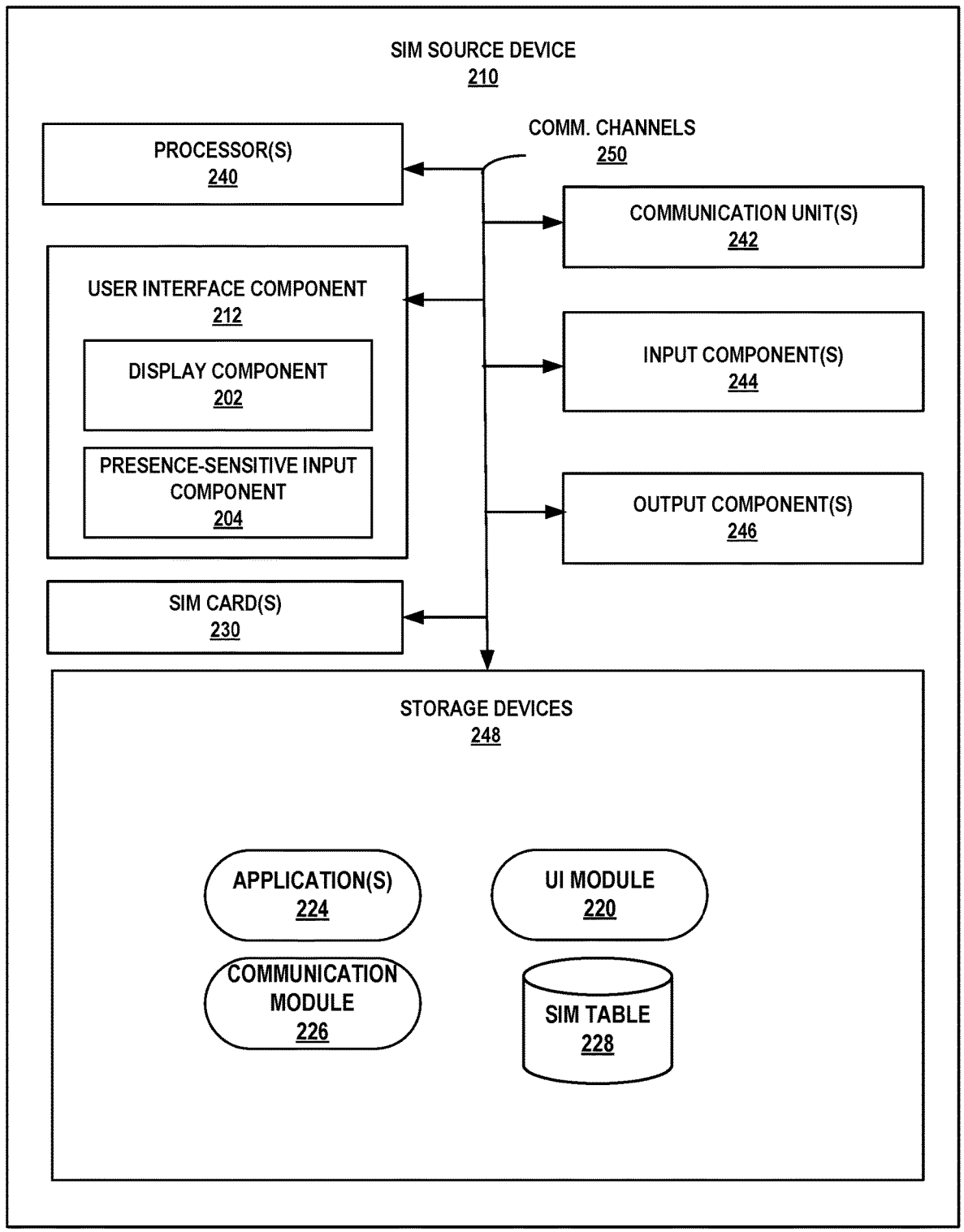
FIG. 2 is a block diagram illustrating an example SIM source device that is configured to enable creation of remote SIMs, in accordance with one or more aspects of the present disclosure.

FIG. 2 is a block diagram illustrating an example SIM source device that is configured to enable creation of remote SIMs, in accordance with one or more aspects of the present disclosure. SIM source device 210 of FIG. 2 is described below as an example of SIM source device 110 of FIG. 1. FIG. 2 illustrates only one example of SIM source device 210, and many other examples of SIM source device 210 may be used in other instances. SIM source device 210 may include a subset of the components included in FIG. 2 or may include additional components not shown in FIG. 2.

As shown in the example of FIG. 2, SIM source device 210 includes UIC 212, one or more processors 240, one or more communication units 242, one or more input components 244, one or more output components 246, SIM cards 230, and one or more storage components 248. UIC 212 includes display component 202 and presence-sensitive input component 204. Storage components 248 of SIM source device 210 includes UI module 220, application modules 224, and communication module 226.

Communication channels 250 may interconnect each of the components 212, 230, 240, 242, 244, 246, and 248 for inter-component communications (physically, communicatively, and/or operatively). In some examples, communication channels 250 may include a system bus, a network connection, an inter-process communication data structure, or any other method for communicating data.

Communication units 242, SIM cards 230, applications 224, and communication module 226 may respectively perform operations similar to communication units 142, SIM cards 130, applications 124, and communication module 126 of SIM source device 110 of FIG. 1.

One or more input components 244 of SIM source device 210 may receive input. Examples of input are tactile, audio, and video input. Input components 242 of SIM source device 210, in one example, includes a presence-sensitive input device (e.g., a touch sensitive screen, a UID), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of SIM source device 210 may generate output. Examples of output are tactile, audio, and video output. Output components 246 of SIM source device 210, in one example, includes a UID, sound card, video graphics adapter card, speaker, cathode ray tube (CRT) monitor, liquid crystal display (LCD), or any other type of device for generating output to a human or machine.

UIC 212 of SIM source device may be similar to UIC 112 of SIM source device 110 and includes display component 202 and presence-sensitive input component 204. Display component 202 may be a screen at which information is displayed by UIC 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202.

While illustrated as an internal component of SIM source device 210, UIC 212 may also represent an external component that shares a data path with SIM source device 210 for transmitting and/or receiving input and output. For instance, in one example, UIC 212 represents a built-in component of SIM source device 210 located within and physically connected to the external packaging of SIM source device 210 (e.g., a screen on a mobile phone). In another example, UIC 212 represents an external component SIM source device 210 located outside and physically separated from the packaging or housing of SIM source device 210 (e.g., a monitor, a projector, etc. that shares a wired and/or wireless data path with SIM source device 210).

UIC 212 of SIM source device 210 may detect two-dimensional and/or three-dimensional gestures as input from a user of SIM source device 210. For instance, a sensor of UIC 212 may detect a user's movement (e.g., moving a hand, an arm, a pen, a stylus, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

One or more processors 240 may implement functionality and/or execute instructions associated with SIM source device 210. Examples of processors 240 include application processors, display controllers, auxiliary processors, one or more sensor hubs, and any other hardware configure to function as a processor, a processing unit, or a processing device.

Modules 220, 222, and 224 may be operable by processors 240 to perform various actions, operations, or functions of SIM source device 210. For example, processors 240 of SIM source device 210 may retrieve and execute instructions stored by storage components 248 that cause processors 240 to perform the operations modules 220, 222, 224, 226, and 228. The instructions, when executed by processors 240, may cause SIM source device 210 to store information within storage components 248.

One or more storage components 248 within SIM source device 210 may store information for processing during operation of SIM source device 210 (e.g., SIM source device 210 may store data accessed by modules 220, 224, and 226 during execution at SIM source device 210). In some examples, storage component 248 is a temporary memory, meaning that a primary purpose of storage component 248 is not long-term storage. Storage components 248 on SIM source device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated modules 220, 224, and 226. Storage components 248 may include a memory configured to store data or other information associated with modules 220, 224, and 226.

In accordance with one or more techniques of this disclosure, SIM source device 210 may enable other devices to create remote SIMs that mirror or otherwise correspond to SIMs of SIM cards 230. For instance, SIM source device 210 may output data (e.g., identity information) to a SIM sink device (e.g., SIM sink device 160 of FIG. 1) that enables the SIM sink device to register a remote SIM with identity information corresponding to the SIM of SIM cards 230. In some examples, SIM source device 210 may then relay data between the SIM sink device and a cellular network. In this way, SIM source device 210 may enable a SIM sink device to communicate over a cellular network using a SIM card that is local to SIM source device 210.

Figure 3:
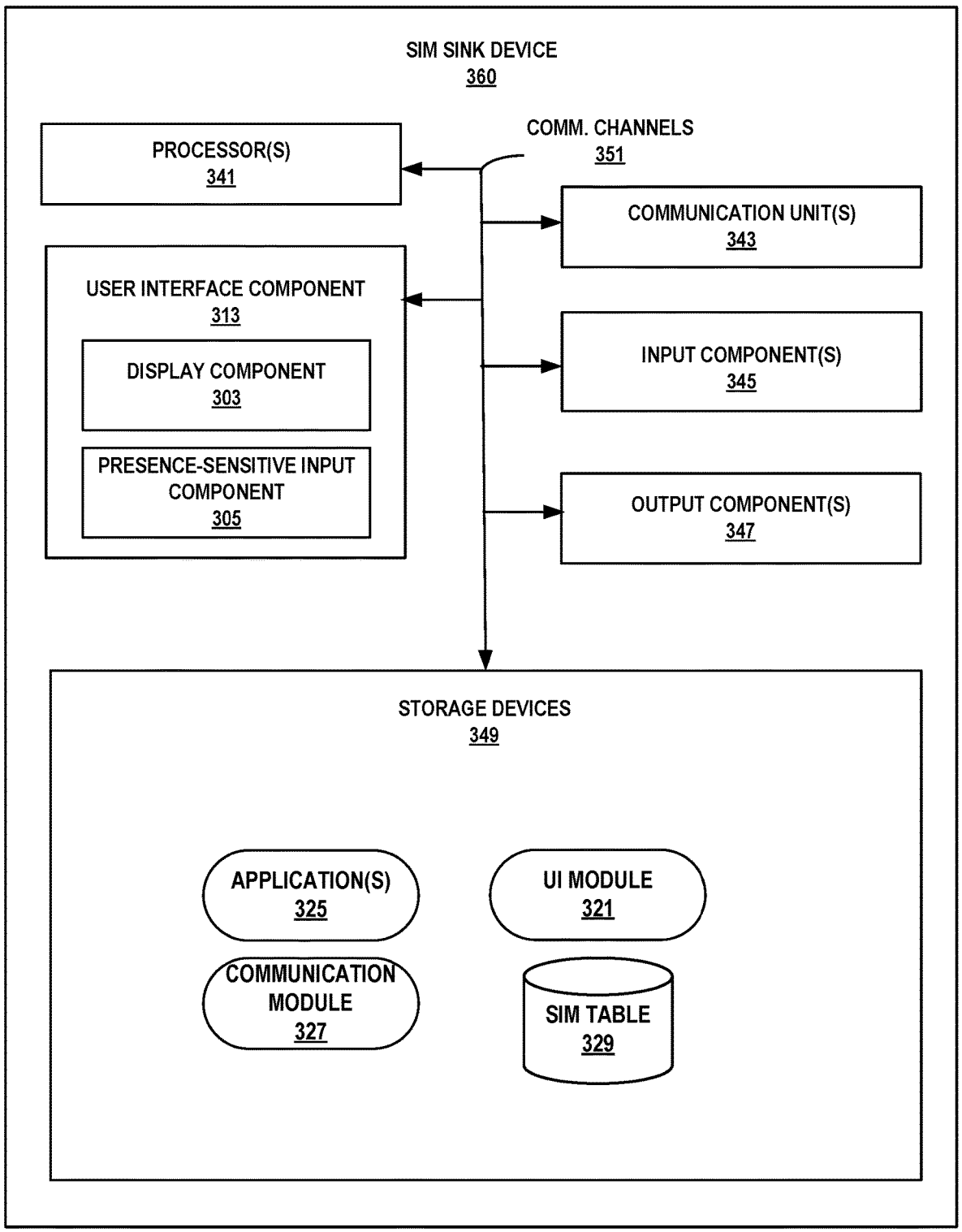
FIG. 3 is a block diagram illustrating an example SIM sink device that is configured to utilize remote SIMs, in accordance with one or more aspects of the present disclosure.

FIG. 3 is a block diagram illustrating an example SIM sink device that is configured to utilize remote SIMs, in accordance with one or more aspects of the present disclosure. SIM sink device 360 of FIG. 3 is described below as an example of SIM sink device 160 of FIG. 1. FIG. 3 illustrates only one example of SIM sink device 360, and many other examples of SIM sink device 360 may be used in other instances. SIM sink device 360 may include a subset of the components included in FIG. 3 or may include additional components not shown in FIG. 3.

As shown in the example of FIG. 2, SIM sink device 360 includes UIC 313, one or more processors 341, one or more communication units 343, one or more input components 345, one or more output components 347, and one or more storage components 349. UIC 313 includes display component 303 and presence-sensitive input component 305. Storage components 349 of SIM sink device 360 includes UI module 321, application modules 325, and communication module 327.

Communication channels 351 may interconnect each of the components 313, 341, 343, 345, 347, and 349 for inter-component communications (physically, communicatively, and/or operatively). In some examples, communication channels 351 may include a system bus, a network connection, an inter-process communication data structure, or any other method for communicating data.

Communication units 343, applications 325, and communication module 327 may respectively perform operations similar to communication units 143, applications 125, and communication module 127 of SIM sink device 360 of FIG. 1.

One or more input components 345 of SIM sink device 360 may receive input. Examples of input are tactile, audio, and video input. Input components 343 of SIM sink device 360, in one example, includes a presence-sensitive input device (e.g., a touch sensitive screen, a UID), mouse, keyboard, voice responsive system, video camera, microphone or any other type of device for detecting input from a human or machine. In some examples, input components 343 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 347 of SIM sink device 360 may generate output. Examples of output are tactile, audio, and video output. Output components 347 of SIM sink device 360, in one example, includes a UID, sound card, video graphics adapter card, speaker, cathode ray tube (CRT) monitor, liquid crystal display (LCD), or any other type of device for generating output to a human or machine.

UIC 313 of SIM sink device 360 may be similar to UIC 112 of SIM sink device 160 and includes display component 303 and presence-sensitive input component 305. Display component 303 may be a screen at which information is displayed by UIC 313 and presence-sensitive input component 305 may detect an object at and/or near display component 303. As one example range, presence-sensitive input component 305 may detect an object, such as a finger or stylus that is within two inches or less of display component 303. Presence-sensitive input component 305 may determine a location (e.g., an [x, y] coordinate) of display component 303 at which the object was detected. In another example range, presence-sensitive input component 305 may detect an object six inches or less from display component 303 and other ranges are also possible. Presence-sensitive input component 305 may determine the location of display component 303 selected by a user's finger using capacitive, inductive, and/or optical recognition techniques. In some examples, presence-sensitive input component 305 also provides output to a user using tactile, audio, or video stimuli as described with respect to display component 303.

While illustrated as an internal component of SIM sink device 360, UIC 313 may also represent an external component that shares a data path with SIM sink device 360 for transmitting and/or receiving input and output. For instance, in one example, UIC 313 represents a built-in component of SIM sink device 360 located within and physically connected to the external packaging of SIM sink device 360 (e.g., a screen on a mobile phone). In another example, UIC 313 represents an external component of SIM sink device 360 located outside and physically separated from the packaging or housing of SIM sink device 360 (e.g., a monitor, a projector, etc. that shares a wired and/or wireless data path with SIM sink device 360).

UIC 313 of SIM sink device 360 may detect two-dimensional and/or three-dimensional gestures as input from a user of SIM sink device 360. For instance, a sensor of UIC 313 may detect a user's movement (e.g., moving a hand, an arm, a pen, a stylus, etc.) within a threshold distance of the sensor of UIC 313. UIC 313 may determine a two or three-dimensional vector representation of the movement and correlate the vector representation to a gesture input (e.g., a hand-wave, a pinch, a clap, a pen stroke, etc.) that has multiple dimensions. In other words, UIC 313 can detect a multi-dimension gesture without requiring the user to gesture at or near a screen or surface at which UIC 313 outputs information for display. Instead, UIC 313 can detect a multi-dimensional gesture performed at or near a sensor which may or may not be located near the screen or surface at which UIC 313 outputs information for display.

One or more processors 341 may implement functionality and/or execute instructions associated with SIM sink device 360. Examples of processors 341 include application processors, display controllers, auxiliary processors, one or more sensor hubs, and any other hardware configure to function as a processor, a processing unit, or a processing device.

Modules 321, 325, and 327 may be operable by processors 341 to perform various actions, operations, or functions of SIM sink device 360. For example, processors 341 of SIM sink device 360 may retrieve and execute instructions stored by storage components 349 that cause processors 341 to perform the operations modules 321, 325, and 327. The instructions, when executed by processors 341, may cause SIM sink device 360 to store information within storage components 349.

One or more storage components 349 within SIM sink device 360 may store information for processing during operation of SIM sink device 360 (e.g., SIM sink device 360 may store data accessed by modules 321, 325, and 327 during execution at SIM sink device 360). In some examples, storage component 349 is a temporary memory, meaning that a primary purpose of storage component 349 is not long-term storage. Storage components 349 on SIM sink device 360 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 349, in some examples, also include one or more computer-readable storage media. Storage components 349 in some examples include one or more non-transitory computer-readable storage mediums. Storage components 349 may be configured to store larger amounts of information than typically stored by volatile memory. Storage components 349 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 349 may store program instructions and/or information (e.g., data) associated modules 321, 325, and 327; and SIM table 329. Storage components 349 may include a memory configured to store data or other information associated with modules 321, 325, and 327; and SIM table 329.

In accordance with one or more techniques of this disclosure, SIM sink device 360 may create remote SIMs that mirror or otherwise correspond to SIMs of remote devices. For instance, SIM sink device 360 may receive data (e.g., identity information) from a SIM source device (e.g., SIM source device 110 of FIG. 1) that enables SIM sink device 360 to register a remote SIM with identity information corresponding to the SIM card of the remote device. In some examples, SIM sink device 360 may then utilize the SIM source device to relay data between SIM sink device 360 and a cellular network. In this way, SIM sink device 360 may communicate with a cellular network without having a local SIM for the cellular network and without having to include a transceiver capable of communicating with the cellular network.

Figure 4:
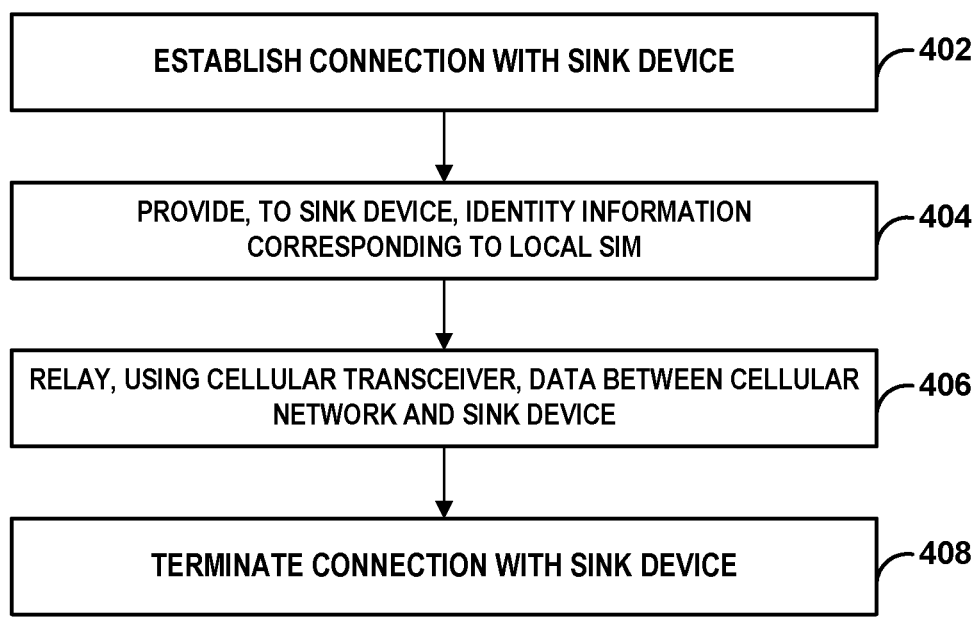
FIG. 4 is a flowchart illustrating example operations performed by a SIM source device to enable the use of remote SIMs, in accordance with one or more aspects of the present disclosure.

FIG. 4 is a flowchart illustrating example operations performed by a SIM source device to enable the use of remote SIMs, in accordance with one or more aspects of the present disclosure. FIG. 4 is described below in the context of system 100 of FIG. 1. Operations 402 through 408 of FIG. 4 may be performed in any order and may include additional or fewer operations than those shown in FIG. 4.

In accordance with techniques of this disclosure, SIM source device 110 may establish a connection with a SIM sink device (402). For instance, SIM source device 110 may establish a wireless (e.g., a Bluetooth) link with SIM sink device 160 of FIG. 1.

SIM source device 110 may provide, to the SIM sink device, identity information corresponding to a local SIM of SIM source device 110 (404). For instance, communication module 126 of SIM source device 110 may cause a communication unit of communication units 142 to transmit, via the established connection with the SIM sink device, identity information corresponding to a SIM of SIM cards 130.

SIM source device 110 may relay, using a local cellular transceiver, data between a cellular network and the SIM sink device (406). For instance, the SIM sink device may register a remote SIM card using the provided identity information and output data to SIM source device 110, which SIM source device 110 then transmits, using a cellular transceiver of communication units 142, to the cellular network to enable the SIM sink device to communicate with external devices.

SIM source device 110 may terminate the connection with the SIM sink device (408). For instance, SIM source device 110 may terminate a Bluetooth link between SIM source device 110 and the SIM sink device.

Figure 5:
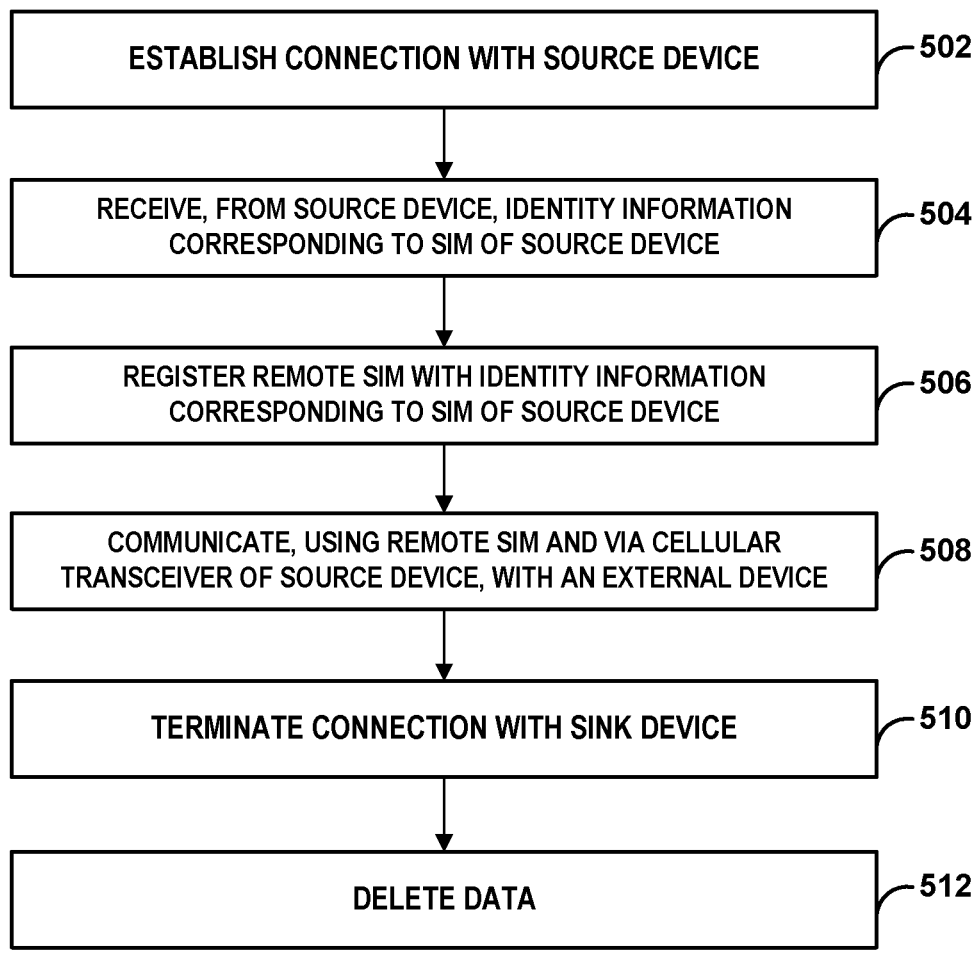
FIG. 5 is a flowchart illustrating example operations performed by a SIM sink device to utilize remote SIMs, in accordance with one or more aspects of the present disclosure.

FIG. 5 is a flowchart illustrating example operations performed by a SIM sink device to utilize remote SIMs, in accordance with one or more aspects of the present disclosure. FIG. 5 is described below in the context of system 100 of FIG. 1. Operations 502 through 512 of FIG. 5 may be performed in any order and may include additional or fewer operations than those shown in FIG. 5.

In accordance with techniques of this disclosure, SIM sink device 160 may establish a connection with a SIM source device (502). For instance, SIM sink device 160 may establish a wireless (e.g., a Bluetooth) link with SIM source device 110 of FIG. 1.

SIM sink device 160 may receive, from the SIM source device, identity information corresponding to a local SIM of the SIM source device (504). For instance, communication module 127 of SIM sink device 160 may receive, via the established connection with the SIM source device, identity information corresponding to a local SIM of the SIM source device.

SIM sink device 160 may register a remote SIM with identity information corresponding to the SIM of the SIM source device (506). For instance, communication module 127 of SIM sink device 160 may add a subscription for the remote SIM in a table of SIMs maintained by communication module 127. In some examples, SIM sink device 160 may register multiple remote SIMs, each respective remote SIM corresponding to identity information corresponding to a respective SIM of the SIM source device.

In some examples, as part of the creation of the remote SIM and/or establishing the connection with the SIM source device, SIM sink device 160 may receive one or more telephony records from the SIM source device. Examples of telephony records include, but are not limited to, a contact list, message logs, and call logs.

SIM sink device 160 may communicate, using the remote SIM and via a cellular transceiver of the SIM source device, with an external device (508). For instance, an application of applications 125 executing at SIM sink device 160 may cause communication module 127 to output data (e.g., an SMS message) using a particular SIM. Communication module 127 may determine, based on information in the table of SIMs, that the particular SIM is the registered remote SIM. In response to this determination, communication module 127 may determine that communication using the remote SIM is accomplished via the SIM source device and forward to data output by the application to the SIM source device for re-transmission to the cellular network using a cellular transceiver of the SIM source device. As discussed above, in some examples, communication module 127 may be included in an operating system layer of SIM sink device 160. As such, an application executing at SIM sink device 160 may be considered to communicate using a remote SIM by requesting that communication module 127 communicate using a SIM in the table of SIMs that happens to be a remote SIM. In this way, an application executing at SIM sink device 160 may communicate using a remote SIM without actually "knowing" whether the SIM is a remote SIM or a local SIM.

SIM sink device 160 may terminate the connection with the SIM source device (510). For instance, the SIM source device may terminate a Bluetooth link between the SIM source device and SIM sink device 160 and/or SIM sink device 160 may terminate a Bluetooth link between the SIM source device and SIM sink device 160.

Responsive to the connection being terminated, SIM sink device 160 may delete data (512). As one example, SIM sink device 160 may de-register the remote SIM. For instance, communication module 127 may remove the remote SIM from the table of SIMs. As another example, communication module 127 may delete any telephony records received from the SIM source device. In this way, SIM sink device 160 may delete all personal information received from the SIM source device upon termination of the connection.

The following numbered examples may illustrate one or more aspects of the disclosure:

1. A method comprising: receiving, by a sink device and from a source device, identity information corresponding to a subscriber information module (SIM) of the source device via a connection between the sink device and the source device; registering, at the sink device, a remote SIM with the identity information corresponding to the SIM of the source device; and communicating, by an application of the sink device and using the remote SIM, with an external device via a cellular radio transceiver of the source device.

2. The method of claim 1, further comprising: responsive to a termination of the connection between the sink device and the source device, deregistering, at the sink device, the remote SIM.

3. The method of any of claims 1-2, further comprising: receiving, by the sink device and from the source device, telephony records.

4. The method of claim 3, wherein the telephony records include one or more of: a contact list, message logs, and call logs.

5. The method of any of claims 1-4, further comprising: responsive to a termination of the connection between the sink device and the source device, deregistering, at the sink device, the remote SIM and deleting the received telephony records.

6. The method of any of claims 1-5, wherein communicating comprises: sending, by the sink device and using the remote SIM, a text message.

7. The method of any of claims 1-6, wherein the connection between the sink device and the source device comprises a wireless connection, and wherein communicating with the external device comprises: outputting, by the sink device and to the source device, data to be transmitted via the cellular radio transceiver of the source device via the wireless connection.

8. The method of claim 7, wherein the wireless connection comprises a Bluetooth link, and wherein the radio transceiver of the source device comprises a cellular transceiver.

9. The method of any of claims 1-8, wherein: receiving the identity information comprises receiving respective identity information for each of a plurality of SIMs of the source device; and registering the remote SIM comprises registering, for each of the plurality of SIMs of the source device, a respective remote SIM with the respective identify information.

10. The method of any of claims 1-9, wherein the sink device does not include a radio transceiver capable of communicating using the remote SIM.

11. The method of any of claims 1-10, wherein the sink device is included in a vehicle.

12. A sink device comprising: one or more communication modules; at least one processor configured to perform the method of claims 1-11.

13. A computer-readable storage medium comprising instructions that, when executed by at least one processor of a sink device, cause the at least one processor to perform the method of claims 1-11.

14. A method comprising: outputting, by a source device and to a sink device, identity information corresponding to a subscriber information module (SIM) of the source device via a connection between the sink device and the source device; and relaying, by the source device and using a cellular radio transceiver of the source device, data between a cellular network and the sink device, wherein the relayed data corresponds to a remote SIM registered at the sink device with the identity information corresponding to the SIM of the source device.

15. The method of claim 14, further comprising: outputting, by the source device and to the sink device, telephony records.

16. The method of any of claims 14-15, wherein the connection between the sink device and the source device comprises a wireless connection, and wherein relaying the data comprises: receiving, by the source device and from the sink device, data via the wireless connection; and transmitting, using the cellular radio transceiver of the source device, the data to the cellular network.

17. The method of claim 16, wherein the wireless connection comprises a Bluetooth link.

18. The method of any of claims 14-17, wherein outputting the identify information comprises outputting respective identity information for each of a plurality of SIMs of the source device.

19. A source device comprising: one or more communication modules; at least one processor configured to perform the method of claims 14-18.

20. A computer-readable storage medium comprising instructions that, when executed by at least one processor of a source device, cause the at least one processor to perform the method of claims 14-18.

By way of example, and not limitation, a computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
    receiving, by a sink device and from a source device, identity information corresponding to a subscriber information module (SIM) of the source device via a wireless connection between the sink device and the source device;
    registering, at the sink device, a remote SIM with the identity information corresponding to the SIM of the source device; and
    communicating, by an application of the sink device and using the remote SIM, with an external device via a cellular radio transceiver of the source device, wherein communicating with the external device comprises outputting, by the sink device and via the wireless connection to the source device, data to be transmitted via the cellular radio transceiver of the source device.

2. The method of claim 1, further comprising:
    responsive to a termination of the wireless connection between the sink device and the source device, deregistering, at the sink device, the remote SIM.

3. The method of claim 1, further comprising:
    receiving, by the sink device and from the source device, telephony records, wherein the telephony records include one or more of: a contact list, message logs, and call logs.

4. The method of claim 3, further comprising:
    responsive to a termination of the wireless connection between the sink device and the source device, deregistering, at the sink device, the remote SIM and deleting the received telephony records.

5. The method of claim 1, wherein the wireless connection comprises a Bluetooth link, and wherein the radio transceiver of the source device comprises a cellular transceiver.

6. The method of claim 1, wherein:
    receiving the identity information comprises receiving respective identity information for each of a plurality of SIMS of the source device; and
    registering the remote SIM comprises registering, for each of the plurality of SIMs of the source device, a respective remote SIM with the respective identify information.

7. The method of claim 1, wherein the sink device does not include a radio transceiver capable of communicating using the remote SIM.

8. A sink device comprising:
    one or more communication modules; and
    at least one processor implemented in circuitry and configured to:
        receive, via the one or more communication modules and from a source device, identity information corresponding to a subscriber information module (SIM) of the source device via a wireless connection between the sink device and the source device;
        register a remote SIM with the identity information corresponding to the SIM of the source device; and
        communicate, by an application of the sink device, via the one or more communication modules, and using the remote SIM, with an external device via a cellular radio transceiver of the source device, wherein, to communicate with the external device the at least one processor is configured to output, via the wireless connection to the source device, data to be transmitted via the cellular radio transceiver of the source device.

9. The sink device of claim 8, wherein the at least one processor is further configured to:
deregister, responsive to a termination of the wireless connection between the sink device and the source device, the remote SIM.

10. The sink device of claim 9, wherein the at least one processor is further configured to:
receive, from the source device, telephony records, wherein the telephony records include one or more of: a contact list, message logs, and call logs; and
delete, responsive to the termination of the connection between the sink device and the source device, the received telephony records.

11. The sink device of claim 8, wherein the sink device does not include a radio transceiver capable of communicating using the remote SIM.

12. A method comprising:
outputting, by a source device and to a sink device, identity information corresponding to a subscriber information module (SIM) of the source device via a wireless connection between the sink device and the source device;
receiving, via the wireless connection, data that corresponds to a remote SIM registered at the sink device with the identity information corresponding to the SIM of the source device; and
relaying, by the source device and using a cellular radio transceiver of the source device, the data between a cellular network and the sink device.

13. The method of claim 12, further comprising:
outputting, by the source device and to the sink device, telephony records.

14. The method of claim 12, wherein the wireless connection comprises a Bluetooth link.

15. The method of claim 12, wherein outputting the identity information comprises outputting respective identity information for each of a plurality of SIMs of the source device.

16. A source device comprising:
one or more communication modules; and
at least one processor implemented in circuitry and configured to:
output, via a non-cellular communication module of the one or more communication modules and to a sink device, identity information corresponding to a subscriber information module (SIM) of the source device via a wireless connection between the sink device and the source device;
receive, via the non-cellular communication module, data that corresponds to a remote SIM registered at the sink device with the identity information corresponding to the SIM of the source device; and
relay, by the source device and using a cellular radio transceiver of the one or more communication modules, the data between a cellular network and the sink device.

17. The source device of claim 16, wherein, to output the identity information, the at least one processor is configured to output respective identity information for each of a plurality of SIMs of the source device.

* * * * *